United States Patent [19]
Stinson

[11] Patent Number: 5,525,850
[45] Date of Patent: Jun. 11, 1996

[54] BRUSHLESS MOTOR STATOR-WINDING SYSTEM

[75] Inventor: Kenneth P. Stinson, Telford, Pa.

[73] Assignee: Penn Engineering & Manufacturing Corp., Danboro, Pa.

[21] Appl. No.: 246,782

[22] Filed: May 20, 1994

[51] Int. Cl.⁶ .............................. H02K 3/00; H02K 1/12; H02K 15/00; H02K 19/26
[52] U.S. Cl. .............................. 310/194; 310/42; 310/179; 310/180; 310/258
[58] Field of Search .................................... 310/194, 179, 310/218, 216, 270, 260, 192, 91, 89, 42, 180, 258

[56] References Cited

U.S. PATENT DOCUMENTS

| | | | |
|---|---|---|---|
| 4,063,123 | 12/1977 | Herr et al. | 310/270 |
| 4,454,439 | 6/1984 | Okamoto et al. | 310/179 |
| 4,563,808 | 1/1986 | Lender | 29/596 |
| 4,709,180 | 11/1987 | Denk | 310/179 |
| 5,304,884 | 4/1994 | Kitajima et al. | 310/198 |
| 5,313,131 | 5/1994 | Hibino et al. | 310/254 |

*Primary Examiner*—Steven L. Stephan
*Assistant Examiner*—Jonathan Link
*Attorney, Agent, or Firm*—Gregory J. Gore

[57] ABSTRACT

A stator coil pre-form assembly is comprised of coils held in compression between inner and outer sleeves. The sleeves are made of non-conductive, non-magnetic material which remain a permanent part of the completed structure after winding. Assembling the sleeves around the coils is accomplished by a winding core tool which is inserted through the center of the inner sleeve. The winding core tool has a dome-shaped head with coil-locating tabs at one end and a series of axially-extending pins around the circumference of the opposite end. Coil wires are wound around pairs of axially-opposing tabs and pins. The outer sleeve is then axially force-fitted over the coils. The tooling and preform permit the use of conventional, automated fly-winding equipment.

8 Claims, 3 Drawing Sheets

BRUSHLESS MOTOR STATOR-WINDING SYSTEM

FIELD OF THE INVENTION

The present invention relates to a brushless DC motor stator-winding structure which utilizes a non-magnetic winding form to secure and locate the wire coils.

BACKGROUND OF THE INVENTION AND DESCRIPTION OF PRIOR ART

Non-static cogging brushless DC motors employ a smooth ferromagnetic stator structure with the coil windings preferably located in the air gap between an inner magnetic rotor and the stator structure. The problem with this construction is that by removing the teeth normally present in a toothed stator structure, the coil-locating and supporting structures have been removed. In general, the coils inserted into the air gap depend upon application of a thermosetting resin ("potting") to hold the coil windings in place. Because the windings must be hand-assembled, the coil position may shift during handling before the plastic resin can be inserted. Misalignment of the coils will result in excessive motor current, variations in the torque produced, and mechanical vibration of the motor.

The problem of reliably supporting the winding coils prior to potting has led to a series of techniques which are labor-intensive and not conducive to automatic assembly methods, including the use of non-magnetic winding pre-forms. U.S. Pat. No. 5, 265,323 to Odell describes a tubular coil form having radially-extending teeth with sidewalls that extend substantially the entire axial length of the coil-forming support member. Thus, the coils are supported by tooth-like structures in the normal manner; but because the tooth material is non-conductive and non-magnetic, no static cogging occurs. The problem with the Odell coil form is that the coil-form tooth structure in the air gap would displace too much volume, thus limiting the use of the maximum amount of coil wire. Ideally, the air gap is completely filled with coil wire. Furthermore, there is no possibility of flaring the end turns after winding so that a rotor can be inserted into the center of the coil structure.

U.S. Pat. No. 4,259,603 issued to Uchiyama et al discloses the use of opposing coil-locating collars at opposite ends of a cylindrical structure to constitute a coil form. The Uchiyama teachings do not demonstrate or suggest the use of retaining the wound coils between inner and outer cylinders. Furthermore, the use of two collars prevents the possibility of applying an outer cylinder to independently support the coils. U.S. Pat. No. 4,818,911 to Taguchi et al shows the use of inner and outer cylinders located about stator coils; however, the coils are not supported by the cylinders, but rather by a separate, self-supporting coil form. The outer cylinder is not applied directly against the coil windings, nor is that structure possible to achieve with the Taguchi coil form.

There is therefore a need in the motor coil assembly arts to create a self-supporting coil winding pre-form which securely holds the wound stator coil in proper alignment and protects it against damage. There is further a need in the art for a structure and method creating an air-gap-positioned coil assembly which permits the use of high-speed, automated coil-winding equipment. There is also a need for a low cost, coil-winding process which will provide a brushless DC motor with high performance.

SUMMARY OF THE INVENTION

The present winding form and assembly system has been devised to permit the use of conventional fly-winding assembly equipment in making wound armatures for brush-commutated DC motors to achieve a non-static cogging stator winding. As in known methods, a pre-wound stator coil assembly is inserted into a motor housing which contains ferromagnetic laminae that provide a magnetic support structure for the coils. However, a unique structural feature of the present stator coil pre-form assembly is that the coils are held by compression between inner and outer pre-form sleeves. The sleeves are located to form concentric cylinders which reliably secure the coils by force-fit and protect them against any movement and make the subassembly easy to handle. Also, a novel winding tool has been devised which permits the coils to be machine-wound and held in place during application of the pre-form sleeves.

To accomplish the application of the sleeves, a two-piece winding form subassembly made of non-conductive, non-magnetic material, which remains a permanent part of the completed structure after winding, is employed. The first part, a winding form collar having coil-locating tabs is placed on top of the second part, an inner sleeve similarly of non-conductive and non-magnetic material which has the same inner and outer diameter as the winding form collar. A temporary winding core tool, having an outer diameter equal to the inside diameter of the Winding collar and inner sleeve, is inserted through the center of these two winding form parts, holding them in position prior to winding the coils. The winding core tool has a dome-shaped head on one end and a series of axially-extending pins around the circumference of the opposite end.

When both winding form parts are assembled on the tooling core, the coil-locating tabs are at one end of the core and the axially-extending pins project from the opposite end of the inner sleeve. Proper alignment of the windings is provided by the tab structures on the winding form collar, which are positioned in radial alignment with the opposing pins. The coil wire is then wound in the conventional loop manner around pairs of axially-opposing tabs and pins. Narrow slots in the tabs of the collar cause the wire coils to lay along the outer circumference of the inner sleeve during winding.

Using an automated winding process, the plane defined by the arc of the applied wire is positioned close enough to the axis of the core tool so as to radially lie within a pair of successive pins as the wire passes across the bottom of the coil form. The domed head of the tool at the top end (the end opposite the pins) is significant because as the wire passes over the top of the tool, it slides off of the smooth dome surface into the tab slots. This is an important feature of the present invention which further permits the use of automated winding equipment that loops the wire only in a single plane.

After all coils are wound, a cylindrical outer sleeve of non-conductive, non-magnetic material is inserted axially over the coils to hold them in place. When the outer sleeve is applied against the coil wires, the wiring is forced inward against the inner sleeve, spreading the wire into substantially all of the area around the circumference of the inner sleeve. By selecting the proper amount of winding wire and spacing between the sleeves, the application of the outer sleeve will be a force-fit. The coils will then be tightly held and will completely fill the space between the sleeves after the outer sleeve is applied. Thus, prior to potting, the coil subassembly will be self-supporting with the individual wires held tightly in compression between the sleeves, preventing any possible radial or tangential movement. Lastly, the tooling core may be removed, since the assembly of wire coils and sleeves has become self-supporting. Because the tooling core pins extend beyond the end of both the inner and outer coil-retaining sleeves, necessary excess end-turn coil material has accumulated during winding, allowing the end turns to be flared.

The stator-winding assembly is then inserted into a ferromagnetic smooth-surface support structure which has been fitted into a motor housing. The winding form collar tabs act as axial stops against the stator support member when placing the stator assembly into the housing assembly. Next, the end turns of the windings are flared outward about the inner circumference of the end of the motor housing by a tapered flaring tool. This permits the inner rotor to pass through the end turns so that it may be installed into the motor housing. Lastly, the entire assembly, including motor housing, windings, and pre-form sleeves are all potted in a thermosetting resin in the usual manner.

More specifically described, the applicant has devised a coil assembly for a brushless DC motor, comprising: a cylindrical toothless inner sleeve; a plurality of wire coils laid about the outer surface of the inner sleeve; and a cylindrical toothless outer sleeve placed over the coils, the outer sleeve dimensioned to provide a force-fit so that the coils are held firmly against the inner sleeve by the inside surface of outer sleeve fitted directly onto the coils, the sleeves and coils constituting a free-standing coil subassembly held together solely by co-mutual compression between its elements. The coils occupy substantially all of the volume between the sleeves, and the sleeves are made from non-conductive and non-magnetic material. A winding-form collar with a cylindrical portion abuts one end of the inner sleeve, having the same inside and outside diameter. The collar further includes a plurality of radially-extending, planar flange segments defining the coil-locating tabs. A plurality of arcuate slots are formed in the tabs between the tabs and the cylindrical outer surface of the collar. Wires are laid about the outer surface of the inner sleeve by winding the wire about the winding-form collar tabs and into the slots. The coil assembly is located within a substantially cylindrical ferromagnetic stator structure having a smooth inner surface of substantially the same inside diameter as the outside diameter of the outer sleeve. The coil assembly and stator structure are affixed within a motor housing.

Also, the applicant has devised a method of creating a brushless DC motor stator assembly comprising the steps of: inserting a winding core tool into an inner sleeve, the sleeve having two opposing ends with a winding collar having a slotted flange defining tabs at a first end and having a plurality of axially-extending pins which project from a second end of the inner sleeve opposite the tabs; winding a wire in tight loops around the tabs and pins such that the wire forms a plurality of coils which lay along the outer surface of the inner sleeve; placing an outer sleeve around the wire coils, whereby the coils are firmly held between the inner and outer surfaces of the sleeves respectively; and axially-retracting the winding core tool from the inner sleeve.

It will be readily understood from the foregoing explanation and description that a conventional fly-winding machine may be used to create non-static cogging of a brushless DC motor having stator coils accurately positioned within a smooth-surfaced ferromagnetic stator structure in the air gap between the stator structure and an internal rotor containing permanent magnets. Other objects and advantages will become apparent from the following drawings and description of the preferred embodiment.

DESCRIPTION OF THE PREFERRED EMBODIMENT

Figure 1:
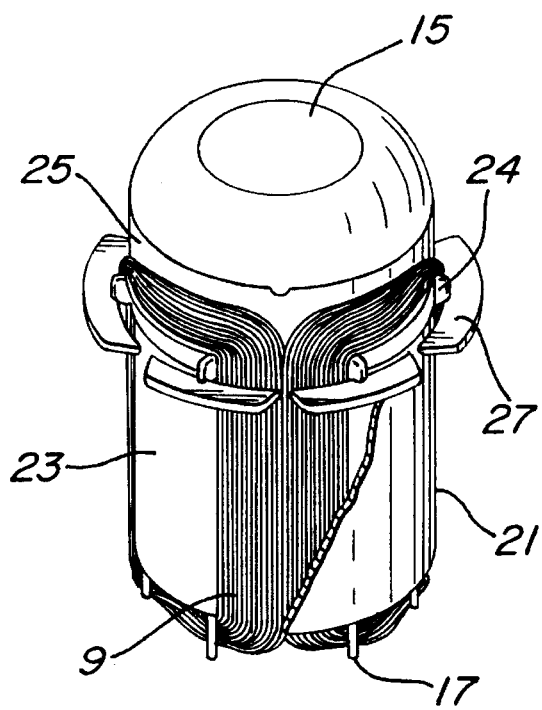
FIG. 1 is a top front isometric view of the coil forms and tooling after some coils have been wound.

Referring now to FIG. 1, the coil-winding subassembly is depicted with winding tooling core 15 in place. As shown in FIG. 1, wire coils 9 are wrapped about radially-projecting teeth 24 on the winding collar 25 and about axially-extending pins 17 which project from the bottom of the inner winding sleeve 23. After all winding has been completed, outer sleeve 21 is applied and the winding tool 15, which includes pins 17, is retracted afterward. For the purposes of illustration, FIGS. 1, 3, 4 and 5 are all shown with only three coils wound to more clearly depict the invention; however, it should be understood that the coil form shown in FIG. 1 is designed to accept a total of six coils.

Figure 2:
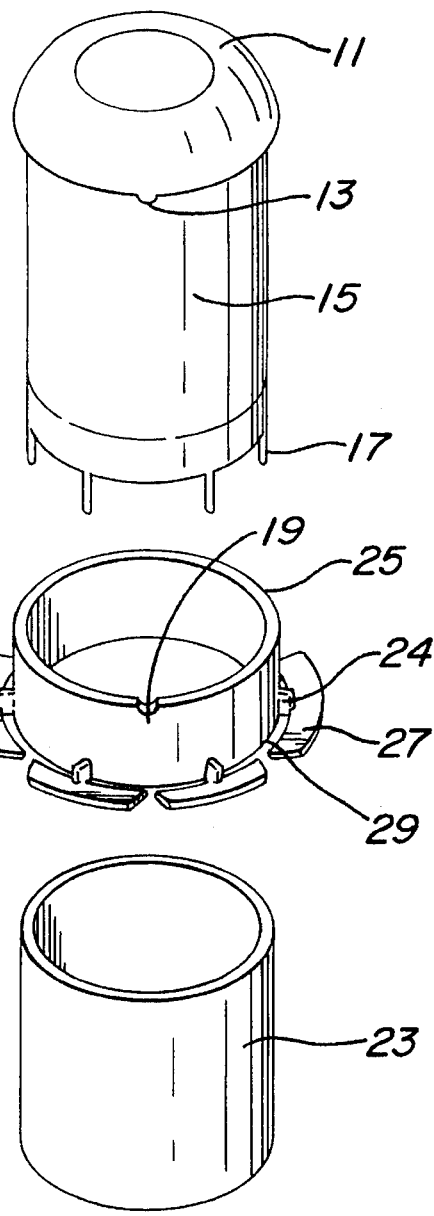
FIG. 2 is a top front exploded drawing of the winding components of FIG. 1 without the wire coils.
Figure 2:
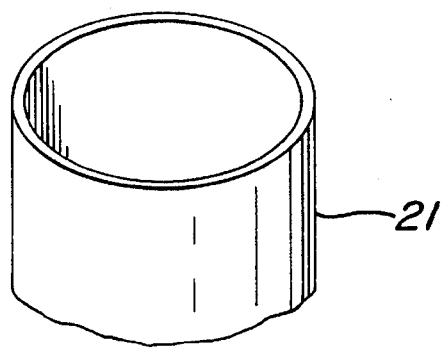

Greater detail of the coil form and tooling elements may be seen with regard to FIG. 2, which shows all parts except the coils depicted as separate elements, but in an exploded view. Beginning at the top, the winding tool 15 is a cylindrical structure with head 11 at the top and axially-extending pins 17 projecting from the bottom. A key 13 is located along the bottom of head 11. The winding tool 15 fits into collar 25 which includes an indexing detent 19 that fits around key 13 when the collar is properly aligned with the winding tool.

The winding collar 25 further includes a plurality of radially-extending teeth 24 which support the planar segmented flange elements 27 that form coil-winding tabs that provide proper alignment of the wound coils. The sides to the tabs are cut to form divergent spacing between adjacent tabs so that when the wires are wound in a single winding plane, they will be received between the tabs. Arcuate slots 29 are formed between the inner edges of tabs 27 and the outside surface of the collar. The slots are long and narrow in order to spread the wire along the outer surface of the inner sleeve during winding.

Inner sleeve 23 is of the same inner and outer dimensions as the cylindrical portion of collar 25 which it abuts at its top. The winding tool 15 is inserted through the collar 25 and inner sleeve 23 to jointly form a coil preform ready to accept the coil wire. Outer sleeve 21 which like inner sleeve 23 is concentric with the winding tool is dimensioned to provide a force-fit when applied directly to the coil wire. The coils are thus held only in by the compressive forces between the sleeves.

As seen from FIG. 1, the outer sleeve 21 is applied axially from the bottom end of the coil-wound subassembly. The unique construction of the present invention allows the fitting of the outer sleeve in this manner because pins 17 hold the wound coils radially inward, allowing the outer sleeve to pass over the end turns. This is a unique aspect of the present invention. After the outer sleeve has been applied, the tooling core can be retracted and a free-standing subassembly of the stator coils is formed, which may be handled carelessly without disturbing the placement of the coils. Furthermore, the coils are protected by the outer sleeve which covers them.

Figure 3:
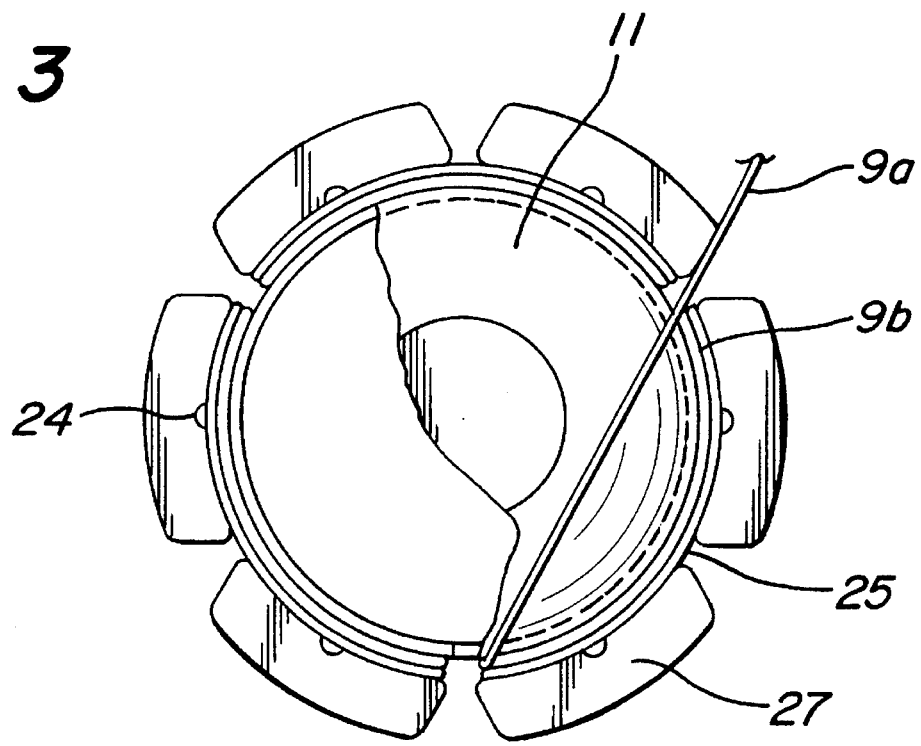
FIG. 3 is a top view of the tooling core and pre-form winding assembly during winding.

Referring now to FIG. 3, a top view of the coil form subassembly is shown with coil wire 9a being applied. Tabs 27 are cut to form openings that will receive the application of wire along a single plane such as is delivered by standard coil-winding equipment. As the wire passes across the top of the dome head 11 of the coil-winding tool, it slides down off of the head along the outer circumference of the cylindrical portion of collar 25, between the tabs and into the slots, taking the position in the tab slot indicated as 9b in this figure.

Figure 4:
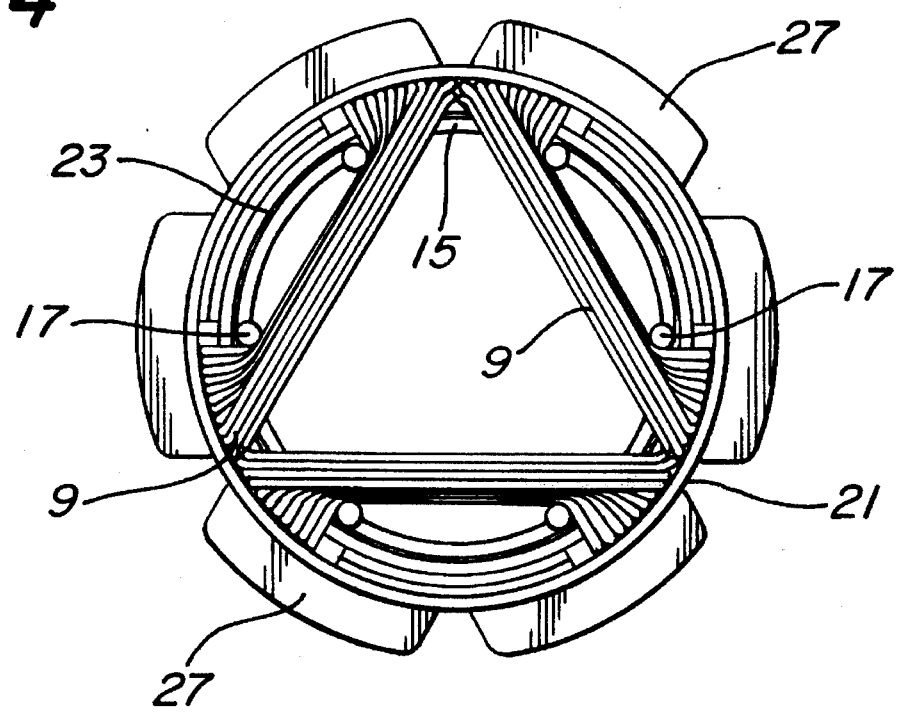
FIG. 4 is a bottom view of the invention shown in FIG. 1.

Referring now to FIG. 4, a bottom view of FIG. 1 is shown. From this view, the pins 17 which project from the bottom of winding tool 15 are clearly shown holding wire end turns 9 within the outside diameter of the inner sleeve. This permits outer sleeve 21 to be applied directly against the winding coils holding them in force-fit compression between inner sleeve 23 and outer sleeve 21.

Figure 5:
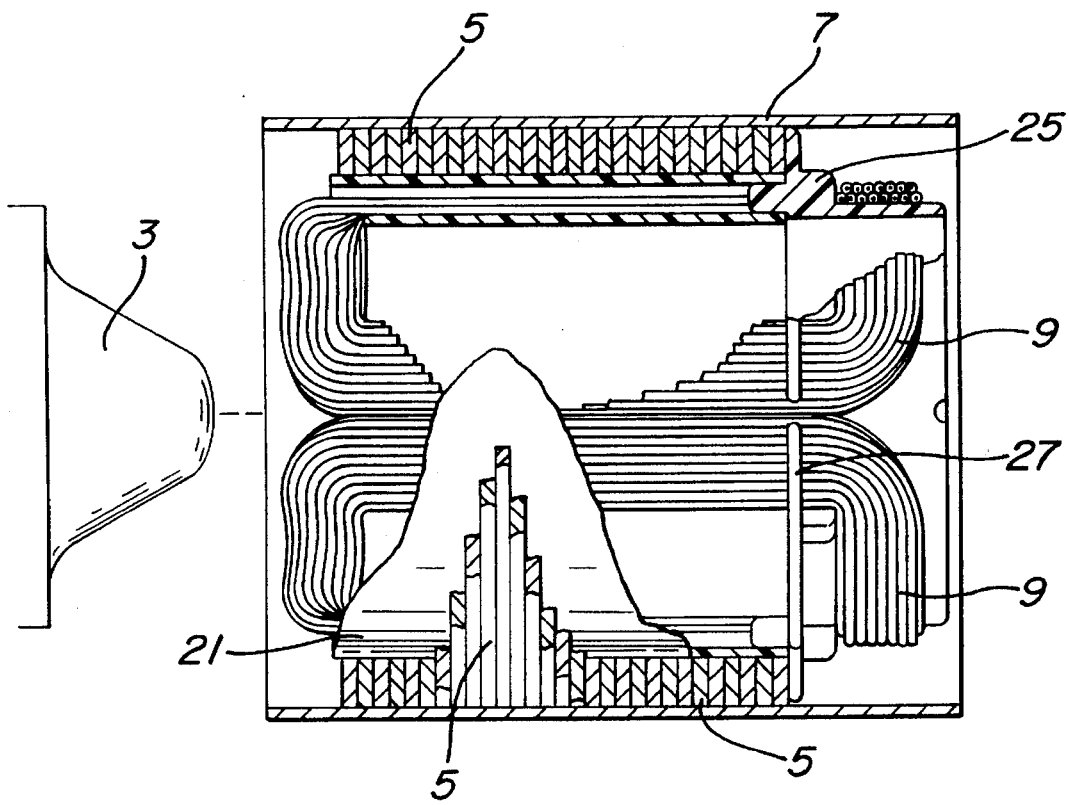
FIG. 5 is a sectional side view of the winding coil subassembly inserted into a motor housing with a flaring tool being applied to the coil end turns.

Referring now to FIG. 5, the coil subassembly of FIG. 4 is shown fitted into motor housing 7 which includes iron laminate assembly 5 dimensioned to closely receive the outside circumference of outer sleeve 21. A convex flaring tool 3 is then applied to the bottom end turns to outwardly displace the wire a distance beyond the inside diameter of the inner sleeve so that a permanent magnet rotor (not shown) can be installed.

Figure 6:
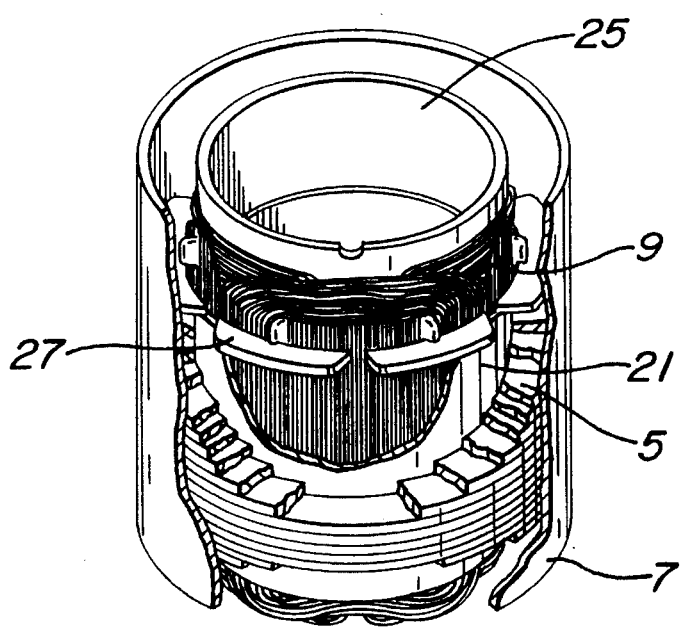
FIG. 6 is a top front-sectioned isometric view of the completed motor assembly constructed according to the present invention.

Referring now to FIG. 6, a top front cutaway view is shown of the stator coil assembly of the present invention installed into the motor housing 7. A ferromagnetic stator structure 5 is formed by assembling a plurality of circular iron plates. The inside diameter of these plates is substantially equal to the diameter of outer sleeve 21. The ferromagnetic plates are closely fitted into motor housing Z after all elements are assembled. As shown in FIG. 6, the entire assembly is potted in a thermosetting resin which permanently fixes all elements together as a single unit. Thereafter, the other elements of the motor, such as rotor and end plates, are fitted in the normal fashion. It will be noted that this figure does not accurately correspond to FIGS. 1, 3, 4 and 5 which as explained above depicted only three winding coils for clarity of illustration. The assembly shown in FIG. 6 shows a full assembly employing all six coils.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A coil assembly for a brushless DC motor, comprising:
    an uncut, preformed cylindrical toothless inner sleeve;
    a plurality of wire coils laid about the outer surface of said inner sleeve; and
    an uncut, preformed cylindrical toothless outer sleeve placed over said coils, said outer sleeve dimensioned to provide a force-fit so that said coils are held firmly against the inner sleeve by the inside surface of outer sleeve fitted directly onto the coils, said sleeves and said coils constituting a free-standing coil subassembly held together solely by co-mutual compression between its elements.

2. The coil assembly of claim 1, further described in that said coils occupy substantially all of the volume between the sleeves.

3. The coil assembly of claim 2, wherein the sleeves are made from non-conductive and non-magnetic material.

4. The coil assembly of claim 3, further including a winding-form collar having a cylindrical portion abutting one end of said inner sleeve being of the same inside and outside diameter as said inner sleeve, said collar further including a plurality of radially-extending, planar flange segments defining coil-locating tabs.

5. The coil assembly of claim 4, further including a plurality of arcuate slots formed in said tabs between the tabs and the cylindrical outer surface of said collar.

6. The coil assembly of claim 5, wherein said wires are laid about the outer surface of the inner sleeve by winding the wire about said winding-form collar tabs and into said slots.

7. The coil assembly of claim 6, further described in that said coil assembly is located within a substantially cylindrical ferromagnetic stator structure having a smooth inner surface of substantially the same inside diameter as the outside diameter of said outer sleeve.

8. The coil assembly of claim 7, further described in that said coil assembly and said stator structure are affixed within a motor housing.

\* \* \* \* \*